J. A. E. SELLAR.
NEEDLE FOR HYPODERMIC SYRINGES.
APPLICATION FILED MAY 13, 1912.
1,050,042.
Patented Jan. 7, 1913.
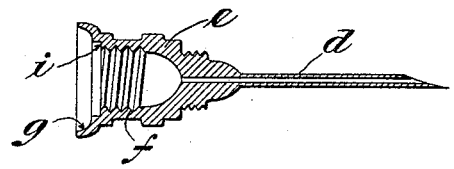
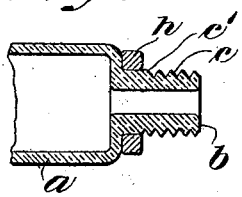
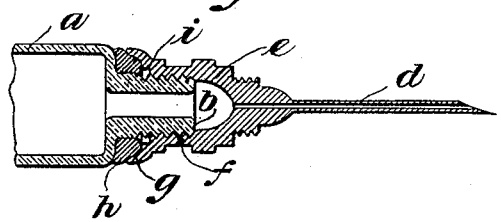
Witnesses:
Inventor,
J. A. E. Sellar

UNITED STATES PATENT OFFICE.

JOHN A. E. SELLAR, OF EVERETT, MASSACHUSETTS, ASSIGNOR OF ONE-THIRD TO WILLIAM E. MAHONEY, OF CAMBRIDGE, MASSACHUSETTS, AND ONE-THIRD TO ERNEST MONNIER, OF BROOKLINE, MASSACHUSETTS.

NEEDLE FOR HYPODERMIC SYRINGES.

1,050,042. Specification of Letters Patent. Patented Jan. 7, 1913.

Application filed May 13, 1912. Serial No. 696,864.

*To all whom it may concern:*

Be it known that I, JOHN A. E. SELLAR, a citizen of the United States, residing at Everett, in the county of Middlesex and State of Massachusetts, have invented certain new and useful Improvements in Needles for Hypodermic Syringes, of which the following is a specification.

This invention relates to a hypodermic syringe needle having an internally screw-threaded hub adapted to be screwed on an externally threaded glass nipple at the delivery end of a glass syringe barrel.

The invention is embodied in certain improvements in the hub portion of the needle, and has for its objects, first, to insure a tight closure of the joint between the hub and the nipple by the usual compressible rubber washer, and prevent the possibility of leakage at said joint, and, secondly, to prevent liability of breakage of the nipple by the operation of screwing the hub upon it.

The invention consists in the improvements which I will now proceed to describe and claim.

In the drawings,—Figure 1 represents a sectional view of a syringe needle embodying my invention. Fig. 2 represents a sectional view of one end portion of the syringe barrel, including the screw-threaded glass nipple. Fig. 3 represents a sectional view showing the needle hub in place on the nipple.

The same letters of reference indicate the same parts in all of the figures.

In the drawings, $a$ represents the glass barrel of a hypodermic syringe, and $b$ represents the nipple through which the contents of the barrel are ejected by the usual piston, not shown. The nipple $b$ is formed with an external screw-thread $c$ the inner end of which forms a shoulder $c'$ near the end of the barrel $a$.

$d$ represents a tubular body and $e$ the hub of a hypodermic needle, the hub being provided with an internal screw-thread $f$. The outer end of the hub is enlarged and provided with an outer recessed annular face $g$ adapted to receive the greater part of the usual annular rubber washer $h$ which surrounds the inner end portion of the nipple $b$, said face forming a bearing for the outer side of the washer.

$i$ represents an inner recessed annular face which is located between the outer face $g$ and the outer extremity of the internal thread $f$. The inner face $i$ surrounds the threaded socket in the hub, the outer end of the socket thread being offset from the outer face $g$ and from the washer bearing on the outer face.

The faces $g$ and $i$ are so formed that when the hub is screwed in place on the nipple, the outer portion of the internal thread $f$ cannot come to a bearing on the shoulder $c'$ of the nipple. There is therefore no liability of breaking the nipple, as there would be if the outer portion of the socket thread were allowed to come to a direct bearing on the shoulder $c'$.

As shown by Fig. 3, the outer face $g$ receives the greater part of the washer $h$ and holds the washer closely compressed around the base of the nipple, there being no possibility of the washer being squeezed outwardly from its proper place between the end of the barrel and the hub.

It will be seen that if the hub is screwed onto the nipple as far as the washer $h$ will permit, the thickness of the washer being considerably greater than the depth of the recess formed by the face $g$, the end of the internal thread at the mouth of the hub socket will still be separated from the nipple shoulder $c'$ and cannot exert pressure thereon tending to break the threaded portion of the nipple.

I claim:

A hypodermic syringe needle hub having an internally threaded socket, the open end of said socket being provided with a washer-receiving recess, a second recess of smaller diameter being located between the first mentioned recess and the threaded portion of the socket.

In testimony whereof I have affixed my signature, in presence of two witnesses.

JOHN A. E. SELLAR.

Witnesses:
C. F. BROWN,
P. W. PEZZETTI.

Copies of this patent may be obtained for five cents each, by addressing the "Commissioner of Patents, Washington, D. C."